UNITED STATES PATENT OFFICE.

JAMES H. STEBBINS, JR., OF NEW YORK, N. Y.

AZO COLOR.

SPECIFICATION forming part of Letters Patent No. 242,707, dated June 7, 1881.

Application filed February 9, 1881. (Specimens.)

*To all whom it may concern:*

Be it known that I, JAMES H. STEBBINS, Jr., a citizen of the United States, residing at New York, in the county and State of New York, have invented new and useful Improvements in Dye-Stuffs or Coloring-Matters, of which the following is a specification.

This invention relates to a new dye-stuff or coloring-matter which is well calculated to replace cochineal in some of its industrial applications.

In carrying out my invention I take 5.58 pounds of aniline and 5.72 pounds of naphthylamine and dissolve them in 21.9 pounds of muriatic acid (specific gravity 1.15–1.16) diluted with three hundred pounds of water. This combination is then treated with 8.5 pounds of nitrite of potash dissolved in fifty pounds of water, thus producing a combined mixture of the diazoic derivatives of aniline and naphthylamine— that is to say, of diazo-benzole and diazo-naphthaline dissolved in muriatic acid. Furthermore, I dissolve 26.8 pounds of the soda-salt of beta-naphthol monosulpho-acid in two hundred pounds of water made alkaline with twenty pounds of ten per cent. ammonia-water, and add this mixture gradually and under constant stirring to the above mixture of diazobenzole and diazo-naphthaline hydrochlorates. The result is my new coloring, which is precipitated from the solution in the form of fine crystals of a red-brown color. These are collected on a filter, dissolved in water, reprecipitated with common salt, and finally dried and pulverized.

This dye is easily soluble in water and dyes silk or wool in an acid bath of a fine light-scarlet color similar to cochineal. It withstands soaping and sunlight.

If my dye-stuff is first dissolved in hot water, and to this solution is then added a strongly alkaline solution of permanganate of potash, the previously red liquid immediately assumes a fine emerald-green color. If my dye-stuff is treated with strong sulphuric acid, a purple coloration is obtained. If bromine-water is added to the aqueous solution of my dye-stuff, the red color is immediately bleached out.

What I claim as new, and desire to secure by Letters Patent, is—

As a new article of manufacture, the dye-stuff or coloring-matter produced by the reaction of monosulpho-acid of beta-naphthol on a mixture of diazo-benzole and diazo-naphthaline hydrochlorates, combined substantially as herein set forth or by any other means which will produce a like result and having the qualities hereinbefore enumerated.

In testimony whereof I have hereunto set my hand and seal in the presence of two subscribing witnesses.

JAMES H. STEBBINS, JR. [L. S.]

Witnesses:
W. HAUFF,
E. F. KASTENHUBER.